United States Patent Office 3,168,255
Patented Feb. 2, 1965

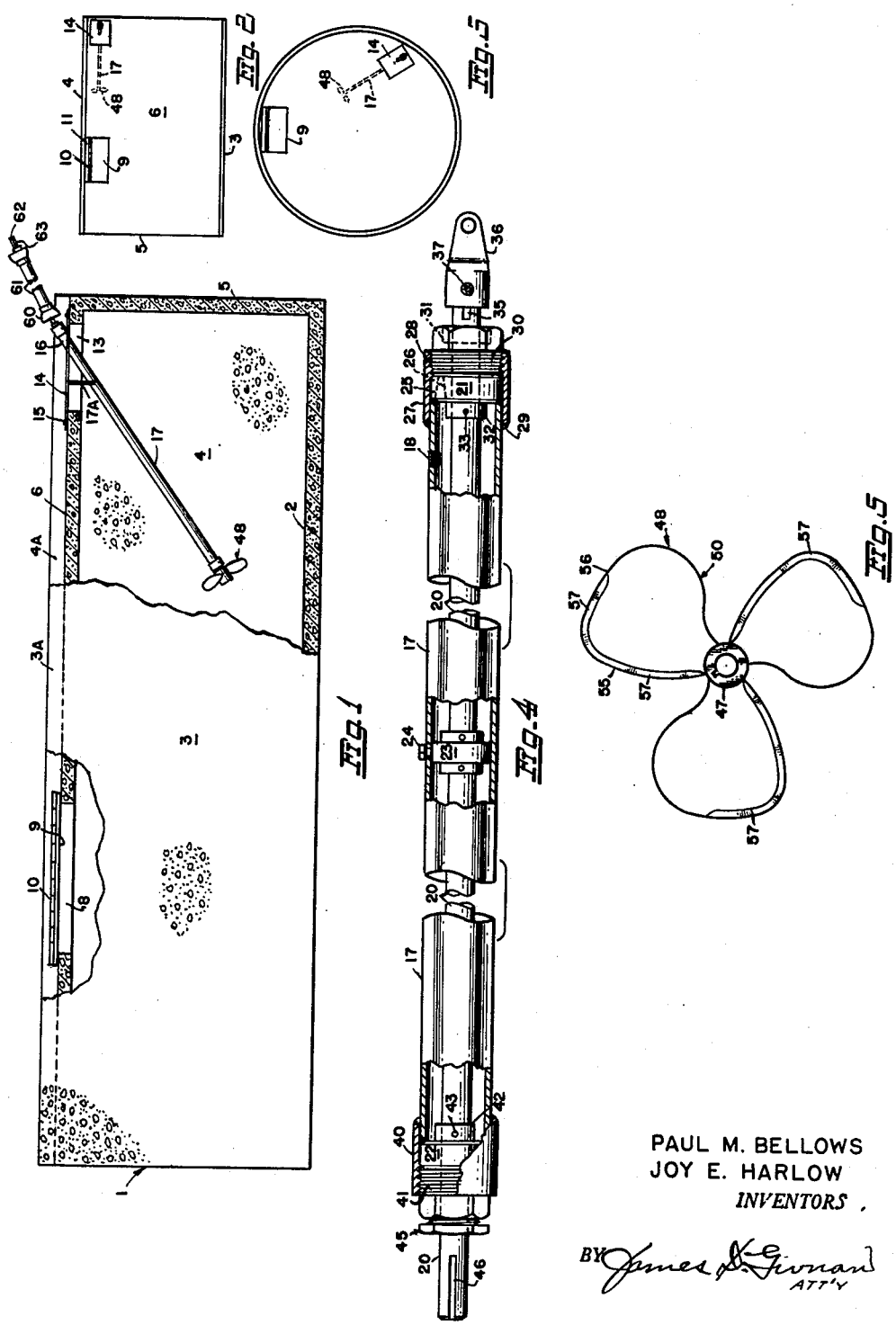

3,168,255
AGITATOR FOR LIQUID MANURE STORAGE TANKS
Paul M. Bellows, Rte. 1, Box 706, Ridgefield, Wash., and Joy E. Harlow, P.O. Box 206, Battle Ground, Wash.
Filed July 6, 1962, Ser. No. 207,878
2 Claims. (Cl. 241—46)

This invention relates to improvements in liquid manure holding tanks and agitating means for the contents thereof.

It is one of the principal objects of the present invention to provide a tank of the character described preferably made of concrete and which may be of rectangular, square, or round formation in plan view. The tank may be embedded in the ground with its top wall flush with the top surface of the ground, if desired, or slightly elevated therefrom to facilitate loading, in either case.

Another object is to provide the top of the tank with a material inlet; a closure for the inlet, and an agitator in the form of a propeller disposed on the interior of the tank whose wake, when in operation, is directed toward the incoming material to effect disintegration of the solids therein and thus render them readily soluble.

Another object resides in the particular curvilinear formation of the leading edge of one propeller blade in relation to the trailing edge of the next to prevent clogging of solids or unsliced material between the blades.

Another object is to provide the leading edge and a part of the peripheral edge of each propeller blade with a hardened and sharpened cutting edge for slicing into the material and cutting straw and hay inter-mingled therewith into sizes that will readily blend into the mixture.

A still further object is to provide the exposed end of the propeller shaft with a universally jointed coupling adapted for attachment to the power take-off of self-propelled farm implements such as tractors and the like, or if desired to an internal combustion engine, electric motor, or any other suitable source of driving power with a variable range of r.p.m., so that preliminary rotation of the propeller may be started slowly then finally combining the liquids and solids by turbulent action into a batter consistency.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a holding tank made in accordance with our invention, with fragments broken away, and which may be of square formation or rectangular or round as shown respectively in FIGURES 2 and 3.

FIGURE 4 is an enlarged fragmentary elevational view of the propeller shaft and its housing, shown in FIGURE 1, with fragments of the housing broken away and with parts in section for convenience of illustration.

FIGURE 5 is an enlarged elevational view of the propeller.

With continuing reference to the drawing wherein like references of character designate like parts reference numeral 1 indicates generally a holding tank having a bottom wall 2, front and rear walls 3 and 4 respectively, side walls 5, and a top wall 6.

The tank is preferably, though not restrictively, made of concrete, and embedded in the ground to a depth where the top wall 6 will be flush with the ground or slightly elevated therefrom if desired.

The front and rear walls 3 and 4 extend above the top wall 6 as at 3A and 4A so that in washing or flushing the top wall the water and material cleaned therefrom will be confined to spillage at either end of the tank and not from all sides thereof.

The top wall 6 has an opening 8 therein provided with a closure lid 9 hingedly attached as at 10 to a plate 11 bolted or otherwise secured to the top wall. The opening 8 is used for filling and dispensing purposes as will be more fully hereinafter described.

The top wall has a second opening 13 therein provided with a permanently closed cover plate 14 secured as at 15 to the top wall 6. Welded or otherwise secured to the plate 14 is the exposed end 16 of a propeller shaft housing 17 provided with an oil filler plug 18 (see FIG. 4) for the purpose of supplying the interior of the housing with a suitable lubricant for a propeller shaft 20 journalled in two identical upper and lower Timken roller bearings 21 and 22 within the ends of the housing 17 and a suitable radial bearing or bearings 23 intermediate the ends thereof and secured in place by a set screw 24. It will be understood, of course, that the upper roller bearing 21 and the universal joint members may be lubricated as needed and that the center bearing 23 and lower roller bearing 22 although packed with grease at the factory can also partake of the lubricant within the shaft housing 17 if and when needed.

The housing 17, in addition to its welded end 16, is also stabilized by securement to the underside of the plate 14 through the medium of a gusset 17A.

The upper and lower Timken bearings 21 and 22 are of the conventional type comprising the usual outer roller race 25, sometimes referred to as the "cup," and the inner roller race 26 referred to as the "cone." The bearing 21 is held within a collar 27 internally threaded as at 28 for a portion of its length and welded as at 29 to the corresponding end of the housing 17. It will be understood, of course, that the collar may be threadedly attached to the housing 17, if desired, and locked relative thereto by a set screw (not shown) or any other suitable means. The inner rim of the bearing cup 25 is positioned against the adjacent end of the housing 17 and so secured by a plug nut 30 provided with any suitable type of grease-seal 31. A set-collar 32 bears against the inner rim of the bearing cone 26 and is secured to the propeller shaft 20 by a pin or set screw indicated at 33. The propeller shaft is thus freely rotatable through the bearing 21, nut 30, grease-seal 31, and extends outwardly therefrom as shown. This extended end of the propeller shaft is provided with a key slot 35 for keyed engagement with one member 36 of a universal joint also secured to the shaft by a set screw 37.

The lower roller bearing 22 is similarly mounted relative to the opposite end of the housing 17 by means of a collar 40, plug nut 41, set collar 42 secured to the propeller shaft 20 by means of a set screw 43, but instead of a grease-seal 31 is provided with a packing gland indicated generally at 45 extending into the nut 41 and surrounding the propeller shaft 20 in the usual manner. Because of the long unsupported reach of the propeller shaft and its housing forwardly and downwardly from the gusset 17A and the operational torque and thrust loads imposed on the propeller for proper cutting and agitating operations as above pointed out, it will be readily understood that the unique combination of the housing, shaft, bearings, and their related parts is a necessary factor in providing such an assembly which is structurally rigid and inflexible throughout its length in order to deal with such loads without distortion and resultant vacillating tendencies.

The shaft 20 extends outwardly from this lower end of the housing 17 and is slotted as at 46 for keyed securement to the hub 47 of a propeller indicated generally at 48 provided with any desired number of propeller blades indicated generally at 50.

As best illustrated in FIGURE 5, the leading edge 55 of each propeller blade is curved outwardly and away from the hub 47 and away from the trailing edge of the next blade in a direction opposite to the direction of propeller rotation to prevent clogging or jamming of any solids between the blades. The leading edge 55 and the peripheral portion 56 of each propeller blade is suitably hardened and sharpened to a knife edge 57 for the purpose of cutting straw, hay, and similar matter, intermingled with the incoming material as the material enters the tank, into sizes that will readily blend into the mixture within the tank as the material is thereafter circulated around the tank in batter-like density. Operation of the propeller in material of such consistency, in the absence of its stiff and inflexible support, would yield to yawing action because of the foreign matter in the material and its resistance to the cutting action of the leading edge of the propeller blades. It will be readily understood that the rigid, inflexible assembly of the propeller shaft, its housing, and related parts is an important factor in stabilizing the propeller in operation against the resistance or reaction of the material being dealt with and the foreign substances intermingled therewith. The knife edges of the propeller blades and the rigidity of the shaft and its housing cooperate in accomplishing the cutting and agitating operations under minimum stress loads on the entire assembly.

It is to be understood that we do not wish to be limited to the exact outline of the propeller blades as shown in FIGURE 5, since the illustration is merely exemplary of any type of multi-bladed propeller, wherein the curvilinear relationship of the leading edge of one blade to the trailing edge of the next, as above described and for the reasons pointed out, is of functional importance to the invention.

The universal joint member 36 is connected to and cooperates with a companion universal joint member, not shown, but disposed within the adjacent bell-shaped end 60 of a tubular housing 61. Said companion member of the universal joint is connected to the inner end of a driven shaft 62 splined or otherwise machined at its exposed outer end 63 for quick and convenient attachment to the power takeoff of a self-propelled farm implement such as a tractor or the like, not shown, or to an internal combustion engine, electric motor, or other source of driving power, as aforesaid.

From the foregoing it will be apparent that we have provided an agitator that will thoroughly agitate the contents of any shape of holding tank with which it is used and disintegrate solids intermingled with the contents so long as the wake of the revolving propeller is directed to the incoming material and with the propeller elevated a proper distance from the bottom wall of the tank.

While we have shown a particular form of embodiment of our invention, we are aware that many minor changes therein will readily suggest themselves to others skilled in the art without departing from the spirit and scope of the invention. Having thus described our invention what we claim as new and desire to protect by Letters Patent is:

1. A storage tank for liquid manure containing solids and hay and straw intermingled therewith,
   said tank comprising front, rear, and side walls, and
   a one-piece over-all top wall having a filler opening therein at one side thereof,
   said top wall having a second opening therein at one corner thereof and in alignment with said filler opening,
   a cover plate permanently closing said second opening,
   means for cutting, agitating, and blending the liquid, solids, and intermingled material into batter consistency,
   said means comprising an elongated tubular housing permanently secured near one of its ends to said cover plate and extending upwardly and outwardly therefrom,
   said housing extending downwardly and away from said cover plate on a vertical plane with said filler opening and closed at both of its ends by plug nuts,
   a plurality of radial bearings fixedly mounted within said tubular housing at spaced-apart intervals,
   a solid inflexible shaft journaled in said bearings through said plug nuts and extending outwardly from both ends of said housing,
   a propeller secured to said downward end of said shaft,
   means removably attaching the opposite upwardly and outwardly extending end of said shaft to a source of driving power rotatable through a variable range of r.p.m.,
   the leading and peripheral edges of the propeller blades sharpened to a knife edge,
   set collars secured to said shaft and bearing against the radial bearings to absorb lineal compressive forces imposed thereon by the propeller load in its agitating rotation and torsional propeller loads in its cutting rotation, whereby the inherent rigidity and inflexibility of said shaft further stiffened by said housing bearings and plug nuts will stabilize the assembly against distortion and vacillating tendencies relative to its securement to said cover plate.

2. In a storage tank for liquid manure containing solids, and hay and straw intermingled therewith,
   said tank comprising front, rear, and side walls and a one-piece over-all top wall having a filler opening therein and a second opening permanently closed by a cover plate,
   the improvement comprising agitating and cutting means for blending the liquid, solids, and intermingled material into a batter consistency,
   said means comprising an elongated tubular housing permanently secured near one of its ends to said cover plate and extending upwardly and outwardly therefrom,
   said housing extending downwardly and away from said cover plate on a vertical plane with said filler opening and closed at both of its ends by plug nuts,
   a plurality of radial bearings fixedly mounted within said tubular housing at spaced-apart intervals,
   a solid inflexible shaft journaled in said bearings through said plug nuts and extending outwardly from both ends of said housing,
   a propeller secured to said downward end of said shaft,
   means removably attaching the opposite upwardly and outwardly extending end of said shaft to a source of driving power rotatable through a variable range of r.p.m.,
   the leading and peripheral edges of the propeller blades sharpened to a knife edge,
   set collars secured to said shaft and bearing against the radial bearings to absorb lineal compressive forces imposed thereon by the propeller load in its agitating rotation and torsional propeller loads in its cutting rotation, whereby the inherent rigidity and inflexibility of said shaft further stiffened by said housing bearings and plug nuts will stabilize the assembly against distortion and vacillating tendencies relative to its securement to said cover plate.

References Cited by the Examiner

UNITED STATES PATENTS

| | | | |
|---|---|---|---|
| 835,960 | 11/06 | Leaver | 259—106 |
| 1,850,199 | 3/32 | Bryant. | |
| 1,916,192 | 7/33 | David | 259—103 X |
| 2,146,776 | 2/39 | Strominger | 259—23 |
| 2,319,821 | 5/43 | McLean | 259—24 |
| 2,576,802 | 11/51 | Morris. | |
| 2,584,252 | 2/52 | Bourgeois | 259—108 |
| 2,680,602 | 6/54 | Nelson et al. | 259—108 X |
| 2,801,083 | 7/57 | Balassa | 259—97 |
| 3,036,614 | 5/62 | Knapp | 259—107 |
| 3,099,852 | 8/63 | Grant | 15—21 |

FOREIGN PATENTS

| | | |
|---|---|---|
| 654,034 | 2/36 | Germany. |
| 79,925 | 1/19 | Switzerland. |
| 248,473 | 3/47 | Switzerland. |

J. SPENCER OVERHOLSER, *Primary Examiner.*

CHARLES A. WILLMUTH, *Examiner.*